(12) United States Patent
Schumann et al.

(10) Patent No.: US 8,705,016 B2
(45) Date of Patent: Apr. 22, 2014

(54) DEVICE FOR OPTICALLY SCANNING AND MEASURING AN ENVIRONMENT

(75) Inventors: Philipp Schumann, Stuttgart (DE); Martin Ossig, Tamm (DE); Reinhard Becker, Ludwigsburg (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/510,020

(22) PCT Filed: Nov. 11, 2010

(86) PCT No.: PCT/EP2010/006867
§ 371 (c)(1),
(2), (4) Date: Jun. 15, 2012

(87) PCT Pub. No.: WO2011/060899
PCT Pub. Date: May 26, 2011

(65) Prior Publication Data
US 2012/0287265 A1    Nov. 15, 2012

Related U.S. Application Data

(60) Provisional application No. 61/299,166, filed on Jan. 28, 2010.

(30) Foreign Application Priority Data

Nov. 20, 2009    (DE) .......................... 10 2009 055 988

(51) Int. Cl.
*G01C 3/08*    (2006.01)

(52) U.S. Cl.
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 3,830,567 A | 8/1974 | Riegl |
| 3,899,145 A | 8/1975 | Stephenson |

(Continued)

FOREIGN PATENT DOCUMENTS

| | | |
|---|---|---|
| AT | 508635 A1 | 3/2011 |
| AU | 2005200937 A1 | 9/2006 |

(Continued)

OTHER PUBLICATIONS

Merriam-Webster (m-w.com), "Interface". 2012. http://www.merriam-webster.com/dictionary/interface.

(Continued)

*Primary Examiner* — Luke Ratcliffe
(74) *Attorney, Agent, or Firm* — Cantor Colburn LLP

(57) ABSTRACT

In a device for optically scanning and measuring an environment, where the device is a laser scanner having a light emitter which, by a rotary mirror, emits an emission light beam, with a light receiver which receives a reception light beam, which, after passing the rotary mirror and a receiver lens which has an optical axis, is reflected from an object in the environment of the laser scanner. The laser scanner also includes a color camera which takes colored pictures of the environment of the laser scanner, and a control and evaluation unit which, for a multitude of measuring points, determines the distance to the object and links it with the colored pictures, the color camera being arranged on the optical axis of the receiver lens.

10 Claims, 2 Drawing Sheets

(56) References Cited

U.S. PATENT DOCUMENTS

| | | |
|---|---|---|
| 3,945,729 A | 3/1976 | Rosen |
| 4,733,961 A | 3/1988 | Mooney |
| 4,736,218 A | 4/1988 | Kutman |
| 4,984,881 A | 1/1991 | Osada et al. |
| 5,155,684 A | 10/1992 | Burke et al. |
| 5,218,427 A | 6/1993 | Koch |
| 5,313,261 A | 5/1994 | Leatham et al. |
| 5,329,347 A | 7/1994 | Wallace et al. |
| 5,329,467 A | 7/1994 | Nagamune et al. |
| 5,371,347 A | 12/1994 | Plesko |
| 5,402,365 A | 3/1995 | Kozikaro et al. |
| 5,446,846 A | 8/1995 | Lennartsson |
| 5,517,297 A | 5/1996 | Stenton |
| 5,629,756 A | 5/1997 | Kitajima |
| 5,675,326 A | 10/1997 | Juds et al. |
| 5,677,760 A | 10/1997 | Mikami et al. |
| 5,734,417 A | 3/1998 | Yamamoto et al. |
| 5,745,225 A | 4/1998 | Watanabe et al. |
| 5,793,993 A | 8/1998 | Broedner et al. |
| 5,894,123 A | 4/1999 | Ohtomo et al. |
| 5,898,490 A | 4/1999 | Ohtomo et al. |
| 5,933,267 A | 8/1999 | Ishizuka |
| 5,936,721 A | 8/1999 | Ohtomo et al. |
| 5,940,181 A | 8/1999 | Tsubono et al. |
| 5,988,862 A | 11/1999 | Kacyra et al. |
| 6,040,898 A | 3/2000 | Mrosik et al. |
| 6,069,700 A | 5/2000 | Rudnick et al. |
| 6,077,306 A | 6/2000 | Metzger et al. |
| 6,149,112 A | 11/2000 | Thieltges |
| 6,349,249 B1 | 2/2002 | Cunningham |
| 6,445,446 B1 | 9/2002 | Kumagai et al. |
| 6,480,270 B1 | 11/2002 | Studnicka et al. |
| 6,483,106 B1 | 11/2002 | Ohtomo et al. |
| 6,504,602 B1 | 1/2003 | Hinderling |
| 6,512,575 B1 | 1/2003 | Marchi |
| 6,650,402 B2 | 11/2003 | Sullivan et al. |
| 6,675,122 B1 | 1/2004 | Markendorf et al. |
| 6,710,859 B2 | 3/2004 | Shirai et al. |
| 6,750,873 B1 | 6/2004 | Bernardini et al. |
| 6,825,923 B2 | 11/2004 | Hamar et al. |
| 6,856,381 B2 | 2/2005 | Christoph |
| 6,917,415 B2 | 7/2005 | Gogolla et al. |
| 6,965,843 B2 | 11/2005 | Raab et al. |
| 7,029,126 B2 | 4/2006 | Tang |
| 7,069,124 B1 | 6/2006 | Whittaker et al. |
| 7,076,420 B1 | 7/2006 | Snyder et al. |
| 7,127,822 B2 | 10/2006 | Kumagai et al. |
| 7,140,213 B2 | 11/2006 | Feucht et al. |
| 7,190,465 B2 | 3/2007 | Froehlich et al. |
| 7,193,690 B2 | 3/2007 | Ossig et al. |
| 7,285,793 B2 | 10/2007 | Husted |
| 7,352,446 B2 | 4/2008 | Bridges et al. |
| 7,430,068 B2 | 9/2008 | Becker et al. |
| 7,541,830 B2 | 6/2009 | Fahrbach et al. |
| 7,659,995 B2 | 2/2010 | Knighton et al. |
| 7,733,544 B2 | 6/2010 | Becker et al. |
| 7,834,985 B2 | 11/2010 | Morcom |
| 7,847,922 B2 | 12/2010 | Gittinger et al. |
| 7,869,005 B2 | 1/2011 | Ossig et al. |
| 7,900,714 B2 | 3/2011 | Milbourne et al. |
| 7,935,928 B2 | 5/2011 | Seger et al. |
| 7,994,465 B1 | 8/2011 | Bamji et al. |
| 7,995,834 B1 | 8/2011 | Knighton et al. |
| 8,020,657 B2 | 9/2011 | Allard et al. |
| 8,117,668 B2 | 2/2012 | Crampton et al. |
| 8,152,071 B2 | 4/2012 | Doherty et al. |
| 8,269,984 B2 | 9/2012 | Hinderling et al. |
| 8,310,653 B2 | 11/2012 | Ogawa et al. |
| 8,384,914 B2 | 2/2013 | Becker et al. |
| 2002/0059042 A1 | 5/2002 | Kacyra et al. |
| 2002/0143506 A1 | 10/2002 | D'Aligny et al. |
| 2002/0149694 A1 | 10/2002 | Seo |
| 2002/0176097 A1 | 11/2002 | Rodgers |
| 2003/0043386 A1 | 3/2003 | Froehlich et al. |
| 2003/0090646 A1* | 5/2003 | Riegl et al. .................. 356/3 |
| 2003/0137449 A1 | 7/2003 | Vashisth et al. |
| 2003/0179361 A1 | 9/2003 | Ohtomo et al. |
| 2004/0004727 A1 | 1/2004 | Yanagisawa et al. |
| 2004/0027554 A1 | 2/2004 | Ishinabe et al. |
| 2004/0158355 A1 | 8/2004 | Holmqvist et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2005/0046823 A1 | 3/2005 | Ando et al. |
| 2005/0111514 A1 | 5/2005 | Matsumoto et al. |
| 2005/0141052 A1 | 6/2005 | Becker et al. |
| 2005/0172503 A1 | 8/2005 | Kumagai et al. |
| 2005/0190384 A1 | 9/2005 | Persi et al. |
| 2006/0061566 A1 | 3/2006 | Verma et al. |
| 2006/0088044 A1 | 4/2006 | Hammerl |
| 2006/0109536 A1 | 5/2006 | Mettenleiter et al. |
| 2006/0193521 A1 | 8/2006 | England III, et al. |
| 2006/0241791 A1 | 10/2006 | Pokorny et al. |
| 2007/0058154 A1 | 3/2007 | Reichert et al. |
| 2007/0064976 A1 | 3/2007 | England III |
| 2007/0100498 A1 | 5/2007 | Matsumoto et al. |
| 2007/0118269 A1 | 5/2007 | Gibson et al. |
| 2007/0122250 A1 | 5/2007 | Mullner |
| 2007/0150111 A1 | 6/2007 | Wu et al. |
| 2007/0171394 A1 | 7/2007 | Steiner et al. |
| 2007/0181685 A1 | 8/2007 | Zhu et al. |
| 2007/0229929 A1 | 10/2007 | Soreide et al. |
| 2008/0052808 A1 | 3/2008 | Leick et al. |
| 2008/0075326 A1 | 3/2008 | Otani et al. |
| 2008/0154538 A1 | 6/2008 | Stathis |
| 2008/0273758 A1 | 11/2008 | Fuchs et al. |
| 2008/0309546 A1 | 12/2008 | Wakayama et al. |
| 2009/0021351 A1 | 1/2009 | Beniyama et al. |
| 2009/0046752 A1 | 2/2009 | Bueche et al. |
| 2009/0051938 A1 | 2/2009 | Miousset et al. |
| 2009/0095047 A1 | 4/2009 | Patel et al. |
| 2009/0100949 A1 | 4/2009 | Shirai et al. |
| 2009/0133494 A1 | 5/2009 | Van Dam et al. |
| 2009/0161091 A1 | 6/2009 | Yamamoto |
| 2009/0323742 A1 | 12/2009 | Kumano |
| 2010/0030421 A1 | 2/2010 | Yoshimura et al. |
| 2010/0049891 A1 | 2/2010 | Hartwich et al. |
| 2010/0134596 A1 | 6/2010 | Becker |
| 2010/0195086 A1 | 8/2010 | Ossig et al. |
| 2010/0277472 A1 | 11/2010 | Kaltenbach et al. |
| 2011/0025905 A1 | 2/2011 | Tanaka |
| 2011/0066781 A1 | 3/2011 | Debelak et al. |
| 2012/0035788 A1 | 2/2012 | Trepagnier et al. |
| 2012/0035798 A1 | 2/2012 | Barfoot et al. |
| 2012/0046820 A1 | 2/2012 | Allard et al. |
| 2012/0154786 A1 | 6/2012 | Gosch et al. |
| 2012/0169876 A1 | 7/2012 | Reichert et al. |

FOREIGN PATENT DOCUMENTS

| | | |
|---|---|---|
| CN | 1735789 | 2/2006 |
| CN | 1838102 A | 9/2006 |
| DE | 2216765 A1 | 4/1972 |
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10137241 A1 | 9/2002 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10361870 A | 7/2005 |
| DE | 102004015111 A1 | 10/2005 |

(56) References Cited

FOREIGN PATENT DOCUMENTS

| | | |
|---|---|---|
| DE | 102004028090 A1 | 12/2005 |
| DE | 202006005643 U1 | 8/2006 |
| DE | 102005056265 A1 | 5/2007 |
| DE | 102006053611 A1 | 5/2007 |
| DE | 102006024534 A1 | 11/2007 |
| DE | 102007037162 A1 | 2/2009 |
| DE | 102008014274 A1 | 8/2009 |
| DE | 102009035336 B3 | 11/2010 |
| DE | 102010032726 B3 | 11/2011 |
| DE | 102010032725 A1 | 1/2012 |
| DE | 202011051975 U1 | 2/2013 |
| DE | 102012107544 B3 | 5/2013 |
| EP | 0667549 A2 | 8/1995 |
| EP | 0727642 A1 | 8/1996 |
| EP | 0838696 A1 | 4/1998 |
| EP | 0949524 A1 | 10/1999 |
| EP | 1056987 A1 | 6/2000 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 1112941 | 5/1968 |
| GB | 2222695 A | 3/1990 |
| GB | 2336493 A | 10/1999 |
| GB | 2388661 A | 11/2003 |
| GB | 2447258 A | 9/2008 |
| JP | H0357911 A | 3/1991 |
| JP | H04115108 A | 4/1992 |
| JP | H04267214 A | 9/1992 |
| JP | H0572477 A | 3/1993 |
| JP | 07128051 A | 5/1995 |
| JP | H07229963 A | 8/1995 |
| JP | 0815413 A | 1/1996 |
| JP | 0821714 A | 1/1996 |
| JP | H08129145 A | 5/1996 |
| JP | H08136849 A | 5/1996 |
| JP | H08262140 A | 10/1996 |
| JP | 1123993 A | 1/1999 |
| JP | 2000121724 A | 4/2000 |
| JP | 2000249546 A | 9/2000 |
| JP | 2000339468 A | 12/2000 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003202215 A | 7/2003 |
| JP | 2004109106 A | 4/2004 |
| JP | 2004245832 A | 9/2004 |
| JP | 2004348575 A | 12/2004 |
| JP | 2005055226 A | 3/2005 |
| JP | 2005069700 A | 3/2005 |
| JP | 2005215917 A | 8/2005 |
| JP | 2006038683 A | 2/2006 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2009063339 A | 3/2009 |
| JP | 2009541758 A | 11/2009 |
| JP | 2010169405 A | 8/2010 |
| WO | 89/05512 | 6/1989 |
| WO | 97/11399 | 3/1997 |
| WO | 0020880 A2 | 4/2000 |
| WO | 0026612 A1 | 5/2000 |
| WO | 0063645 | 10/2000 |
| WO | 0063681 A2 | 10/2000 |
| WO | 02084327 A2 | 10/2002 |
| WO | 2005008271 A2 | 1/2005 |
| WO | 2005059473 A2 | 6/2005 |
| WO | 2006000552 A1 | 1/2006 |
| WO | 2006053837 A1 | 5/2006 |
| WO | 2007012198 A1 | 2/2007 |
| WO | 2007051972 A1 | 5/2007 |
| WO | 2007087198 A1 | 8/2007 |
| WO | 2007118478 A1 | 10/2007 |
| WO | 2008019856 A1 | 2/2008 |
| WO | 2008048424 A2 | 4/2008 |
| WO | 2008068791 A1 | 6/2008 |
| WO | 2009053085 A1 | 4/2009 |
| WO | 2009095384 A2 | 8/2009 |
| WO | 2009123278 A1 | 10/2009 |
| WO | 2010108644 A1 | 9/2010 |
| WO | 2011021103 A1 | 2/2011 |
| WO | 2012061122 A1 | 5/2012 |
| WO | 2012013525 A2 | 8/2012 |
| WO | 2012103525 A2 | 8/2012 |

OTHER PUBLICATIONS

Merriam-Webster (m-w.com), "Traverse". 2012. http://www.merriam-webster.com/dictionary/traverse.

Merriam-Webster (m-w.com), "Parts". 2012. http://www.merriam-webster.com/dictionary/parts.

International Preliminary Report on Patentability for International Application Serial No. PCT/EP2011/003261. International filed Jul. 1, 2011. Date of Issuance Jan. 29, 2013.

International Preliminary Report on Patentability for International Application Serial No. PCT/EP2011/003262. International filed Jul. 1, 2011. Date of Issuance Jan. 29, 2013.

International Preliminary Report on Patentability for International Application Serial No. PCT/EP2011/003263. International filed Jul. 1, 2011. Date of Issuance Jan. 29, 2013.

International Preliminary Report on Patentability for International Application Serial No. PCT/EP2011/003264. International filed Jul. 1, 2011. Date of Issuance Jan. 29, 2013.

AKCA, Devrim, Full Automated Registration of Laser Scanner Point Clouds, Institute of Geodesy and Photogrammetry, Swiss Federal Institute of Technology, Zuerich, Switzerland; Published Dec. 2003.

First Office Action and Search Report with English Translation for Chinese Patent Application No. 201080003456.3; Issue Date Jan. 17, 2013.

First Chinese Office Action for Application No. 201080003467.1; Office Action Issue Date Feb. 5, 2013; (translated).

Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on-line], Downloaded From: http://proceedings.spiedigitallibrary.org/on Jan. 26, 2013.

International Search Report of the International Searching Authority for Application No. PCT/US2012/075178; Date of Mailing Apr. 9, 2013.

"Scanner Basis Configuration for Riegl VQ-250", Riegl Company Webpage, Feb. 16, 2011, XP002693900, Retrieved from the internet: URL:http://www.riegl.com/uploads/tx_pxpriegldownloads/30_SystemConfiguration_VQ-250_02-11_16-02-2011.pdf [retrieved on Mar. 15, 2013] the whole document.

Written Opinion of the International Searching Authority for Application No. PCT/US2012/075178; Date of Mailing Apr. 9, 2013.

GB Examination Report dated Mar. 27, 2013 for GB Application No. GB1303390.7.

GB Examination Report dated Mar. 27, 2013 for GB Application No. GB1303382.4.

Chinese Office Action for Chinese Application Serial No. 201080047516-1; Date of Issue Apr. 1, 2013.

AKCA, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.

Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.

Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Confer-

(56) References Cited

OTHER PUBLICATIONS ence on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.
Chinese Office Action Dated Jun. 2, 2010 with English Translation of the Text for Application No. 2006800540959.
Chinese Publication No. CN 1445509, published Oct. 1, 2003—English Abstract Not Available; EP Equivalent 1347267.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP002587995, Proceedings of the SPIE.
Godin, G., et al., A Method for the Registration of Attributed Range Images, Copyright 2001, [Retrieved on Jan. 18, 2010 at 03:29 from IEEE Xplore].
International Preliminary Report and Written Opinion for International Application No. PCT/EP2007/005789 mailed Oct. 30, 2007.
International Preliminary Report on Patentability and Written Opinion for PCT/IB2010/002216; Date of Issuance Jan. 24, 2012.
International Preliminary Report on Patentability and Written Opinion for Application No. PCT/EP20091050887; Date of Issue Sep. 7, 2010.
International Preliminary Report on Patentability and Written Opinion for International Patent Application PCT/IB2010/002226; Date of Issuance Jan. 24, 2012.
International Preliminary Report on Patentability and Written Opinion for Application No. PCT/EP2004/014605; Date of Issue Aug. 29, 2006.
International Preliminary Report on Patentability and Written Opinion for PCT/EP2009/050888; Date of Issuance Sep. 7, 2010.
iQsun Laserscanner Brochure, 2 Pages, Apr. 2005.
International Search Report of the International Searching Authority and Written Opinion for PCT/EP2009/009174; Date of Mailing May 25, 2010.
International Search Report of the International Searching Authority for IPCT/EP2010/006867; Date of Mailing Mar. 18, 2011.
International Search Report of the International Searching Authority for PCT/EP2007/005789; Date of Mailing Oct. 30, 2007.
International Search Report of the International Searching Authority for PCT/IB2010/002216; Date of Mailing Feb. 3, 2011.
International Search Report of the International Searching Authority and Written Opinion for PCT/IB2010/002226; Date of Mailing Dec. 13, 2010.
International Search Report of the International Searching Authority for PCT/EP2004/014605; Date of Mailing Apr. 15, 2005.
International Search Report of the International Searching Authority for PCT/EP2006/003010; Date of Mailing Nov. 12, 2006.
International Search Report of the International Searching Authority for PCT/EP2010/001779; Date of Mailing Jul. 20, 2010.
International Search Report of the International Searching Authority for PCT/EP2010/001780; Date of Mailing Jul. 23, 2010.
International Search Report of the International Searching Authority for PCT/EP2010/001781; Date of Mailing Jul. 22, 2010.
International Search Report of the International Searching Authority for PCT/IB2010/002258; Date of Mailing Jan. 28, 2011.
International Search Report of the International Searching Authority for PCT/EP2009/050888; Date of Mailing Sep. 15, 2009.
International Search Report of the International Searching Authority for PCT/EP2010/006866; Date of Mailing Mar. 14, 2011.
International Search Report of the International Searching Authority for PCT/EP2010/006868; Date of Mailing Mar. 14, 2011.
International Search Report of the International Searching Authority for PCT/EP2009/050887; Date of Mailing May 14, 2009.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/servlet/GetPDFServlet?filetype=pdf &id=PSISDG002059000001000316000001&idtype=cvips&doi=10.117/12.150236&prog=normal>[retrieved on Mar. 8, 2011]the whole document.
Umeda, K., et al., Registration of Range and Color Images Using Gradient Constraints and Ran Intensity Images, Proceedings of the 17th International Conference onPatern Recognition (OCPR'04), Copyright 2010 IEEE. [Retrieved online Jan. 28, 2010—IEEE Xplore].
Williams, J.A., et al., Evaluation of a Novel Multiple Point Set Registration Algorithm, Copyright 2000, [Retrieved on Jan. 18, 2010 at 04:10 from IEEE Xplore].
Written Opinion of the International Searching Authority for International Patent Application PCT/EP2010/006867; mailing date Mar. 18, 2011.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/ROBOT.2001.932908 ISBN: 978-0-7803-6576-6, the whole document.
International Search Report of the International Searching Authority for Application No. PCT/EP2011/003261; Date of Mailing Oct. 17, 2011.
International Search Report of the International Searching Authority for Application No. PCT/EP2011/003263; Date of Mailing Oct. 19, 2011.
International Search Report of the International Searching Authority for Application No. PCT/EP2011/003264; Date of Mailing Oct. 19, 2011.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2010] the whole document.
International Search Report of the International Searching Authority for Application No. PCT/EP2011/001662; Date of Mailing May 26, 2011.
Written Opinion of the International Searching Authority for Application No. PCT/EP2011/001662; Date of Mailing May 26, 2011.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.
Ingensand, H., Dr., "Introduction to Geodetic Metrology", "Einfuhrung in die Geodatische Messtechnik", Federal Institute of Technology Zurich, Edition 2004, p. 16.
FARO Laserscanner LS, Presentation Forensic Package, Policeschool of Hessen, Wiesbaden, Germany, Dec. 14, 2005; FARO Technologies, Copyright 2008.
FARO Laser Scanner LS, Recording Reality's Digital Fingerprint, The Measure of Success, Copyright 2005.
Leica Geosystems, FBI Crime Scene Case Study.
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.
Howard, et al., "Virtual Environments for Scene of Crime Reconstruction and Analysis", Advanced Interfaces Group, Department of Computer Science, University of Manchester, Manchester, UK, Feb. 28, 2000.
International Preliminary Report on Patentability and Written Opinion for PCT/EP2010/001779; Date of Issuance Sep. 27, 2011.
International Preliminary Report on Patentability and Written Opinion for PCT/IB2010/002258; Date of Issuance Feb. 21, 2012.
International Preliminary Report on Patentability and Written Opinion for PCT/EP2010/006866; Date of Issuance May 22, 2012.
International Preliminary Report on Patentability and Written Opinion for PCT/EP2010/006867; Date of Issuance May 22, 2012.
International Preliminary Report on Patentability and Written Opinion for PCT/EP2010/001780; Date of Issuance Sep. 27, 2011.
International Preliminary Report on Patentability and Written Opinion for PCT/EP2010/001781; Date of Issuance Sep. 27, 2011.

(56) References Cited

OTHER PUBLICATIONS

International Preliminary Report on Patentability and Written Opinion for PCT/EP2010/006868; Date of Issuance May 22, 2012.
International Preliminary Report on Patentability and Written Opinion for PCT/EP2009/009174; Date of Issuance Aug. 16, 2011.
Leica Geosystems TruStory Forensic Analysis by Albuquerque Police Department, 2006.
Langford, et al., "Practical Skills in Forensic Science", Pearson Education Limited, Essex, England, First Published 2005, Forensic Chemistry.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
Se, et al., "Instant Scene Modeler for Crime Scene Reconstruction", MDA, Space Missions, Ontario, Canada, Copyright 2005, IEEE.
The Scene, Journal of The Association for Crime Scene Reconstruction, Apr.-Jun. 2006, vol. 12, Issue 2.
Written Opinion of the International Searching Authority for Application No. PCT/EP2006/003010; Date of Mailing Dec. 11, 2006.
Chinese Notification of First Office Action for Chinese Application No. 201080003463.3; Issued Oct. 30, 2012 (translated).
German Office Acton for DE Application No. 102013102.554.4; Dated Jan. 9, 2014.
Germany Office Action for DE Application No. 10 2012 107 544.1; Issued Jan. 2, 2013.
First Chinese Office Action for Chinese Patent Applicaiton No. 2013082200801190; Dated Aug. 27, 2013.
Second German Office Action for DE Application Serial No. 10 2009 015 922.3; Dated Dec. 2, 2013.
Second JP Office Action for JP Patent Application Serial No. 2012-534590; Date of Mailing Nov. 12, 2013.
Japanese Office Action for JP Patent Application Serial No. 2012-501174; Dated Oct. 29, 2013.
Second Office Action with English Translation for Chinese Patent Application No. 201080003466.7; Issue Date Jul. 19, 2013.
German Office Action for DE Application Serial No. 102012109481.0; dated Aug. 1, 2013.
Leica Geosystems, FBI Crime Scene Case Study, Cited in Opposition of EP Application No. 07785873.6 in Oral Proceedings held on Jun. 27, 2013, Munchen, Germany; D13, p. 5 of Summons, Tony Grissim, Feb. 2006.
GB Examination Report dated Oct. 7, 2013 for GB Application No. GB1303390.7.
GB Examination Report dated Jun. 19, 2013 for GB Application No. GB1202398.2.
GB Examination Report dated Aug. 15, 2013 for GB Application No. GB 1303382.4.
GB Examination Report dated Aug. 7, 2013 for GB Application No. GB1303390.7.
GB Exam and Search Report for Application No. GB1314371.4; Dated Nov. 22, 2013.
Horn, B.K.P., Closed-Form Solution of Absolute Orientation Using Unit Quaternions, J. Opt. Soc. Am. A., Vol.4., No. 4, Apr. 1987, pp. 629-642, ISSN 0740-3232.
International Search Report of the International Searching Authority for Application No. PCT/EP2011/003262; Date of Mailing Sep. 30, 2011.
Japanese Office Action for JP Application No. 2012-534589; issued Jul. 30, 2013.
Japanese Office Action for Application Serial No. 2013-520987; Date of Mailing Jul. 2, 2013.
Japanese Office Action for Application Serial No. 2013-520989; Date of Mailing Jul. 2, 2013.
Japanese Office Action for Application Serial No. 2012-534590; Date of Mailing Jul. 30, 2013.
Japanese Office Action for JP Application Serial No. 2012-501175; Date of Mailing Jul. 16, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.
Japanese Office Action for JP Application Serial No. 2013-520990; dated Jul. 2, 2013.

\* cited by examiner

DEVICE FOR OPTICALLY SCANNING AND MEASURING AN ENVIRONMENT

CROSS REFERENCE TO RELATED APPLICATIONS

The present application is a National Stage Application of PCT Application No. PCT/EP2010/006867, filed on Nov. 11, 2010, which claims the benefit of U.S. Provisional Patent Application No. 61/299,166, filed on Jan. 28, 2010, and of pending German Patent Application No. DE 10 2009 055988.4, filed on Nov. 20, 2009, and which are hereby incorporated by reference.

BACKGROUND OF THE INVENTION

The invention relates to a device for optically scanning and measuring an environment.

By a device such as is known for example from U.S. Published Patent Application No. 2010/0134596, and which comprises a laser scanner, the environment of the laser scanner can be optically scanned and measured. A rotary mirror which rotates and which comprises a polished plate of a metallic rotor, deflects both an emission light beam and a reception light beam. A collimator of a light emitter is seated in the center of a receiver lens. The receiver lens reproduces the reception light beam on a light receiver which is arranged on an optical axis behind the receiver lens. For gaining additional information, a line scan camera, which takes RGB signals, is mounted on the laser scanner, so that the measuring points of the scan can be completed by color information.

SUMMARY OF THE INVENTION

Embodiments of the present invention are based on the object of creating an alternative to the device of the type mentioned hereinabove.

The arrangement of a color camera on the optical axis of the receiver lens, with respect to the rotary mirror on the same side, has the advantage of avoiding parallax errors almost completely, since the light receiver and the color camera take the environment from the same angle of view and with the same side of the rotary mirror. The same mechanism can be used for the rotary mirror. The used side of the rotary mirror is the same as well. The reception light beam being reflected by the rotary mirror is running in parallel to the optical axis of the receiver lens and continuously hitting on the receiver lens. The receiver lens takes the place of the light receiver, so that there is no change of the shadowing effects. To be able to feed the emission light beam again, an emission mirror in front of the color camera is provided, where the emission mirror is reflecting for the emission light beam and is transparent for the color camera.

Due to the fact that a rear mirror, which reflects the reception light beam that has been refracted by the receiver lens towards the receiver lens, is provided on the optical axis behind the receiver lens, the available space can be better utilized. To complete the "folded optics," a central mirror is provided between the receiver lens and the rear mirror, where the central mirror reflects the reception light beam towards the rear mirror. A suitable form of the mirrors supports focusing, wherein the focusing length with respect to the unfolded optics can still be increased. The central mirror can be used for near-field correction, similar to an additional mask, by reducing the intensity from the near field compared to the far field. Further savings in space result from an arrangement of the light receiver radial to the optical axis of the receiver lens in a cylinder-coordinate system which is defined by the optical axis.

The design of the rotor as a hybrid structure, i.e. as a multi-element structure from different materials, permits a relatively short design which, despite the inclination of the rotary mirror, remains balanced. A combination of a metallic holder, a rotary mirror of coated glass and a plastic housing may be used; however other combinations are possible as well. The holder which is dominating with respect to the mass makes balancing possible, while the housing serves as accidental-contact protection. Glue between the rotor components makes balancing of the different temperature coefficients of expansion possible without impairing the dynamic behavior.

BRIEF DESCRIPTION OF THE DRAWINGS

The invention is explained in more detail below on the basis of an exemplary embodiment illustrated in the drawing, in which.

DETAILED DESCRIPTION OF THE INVENTION

Figure 1:
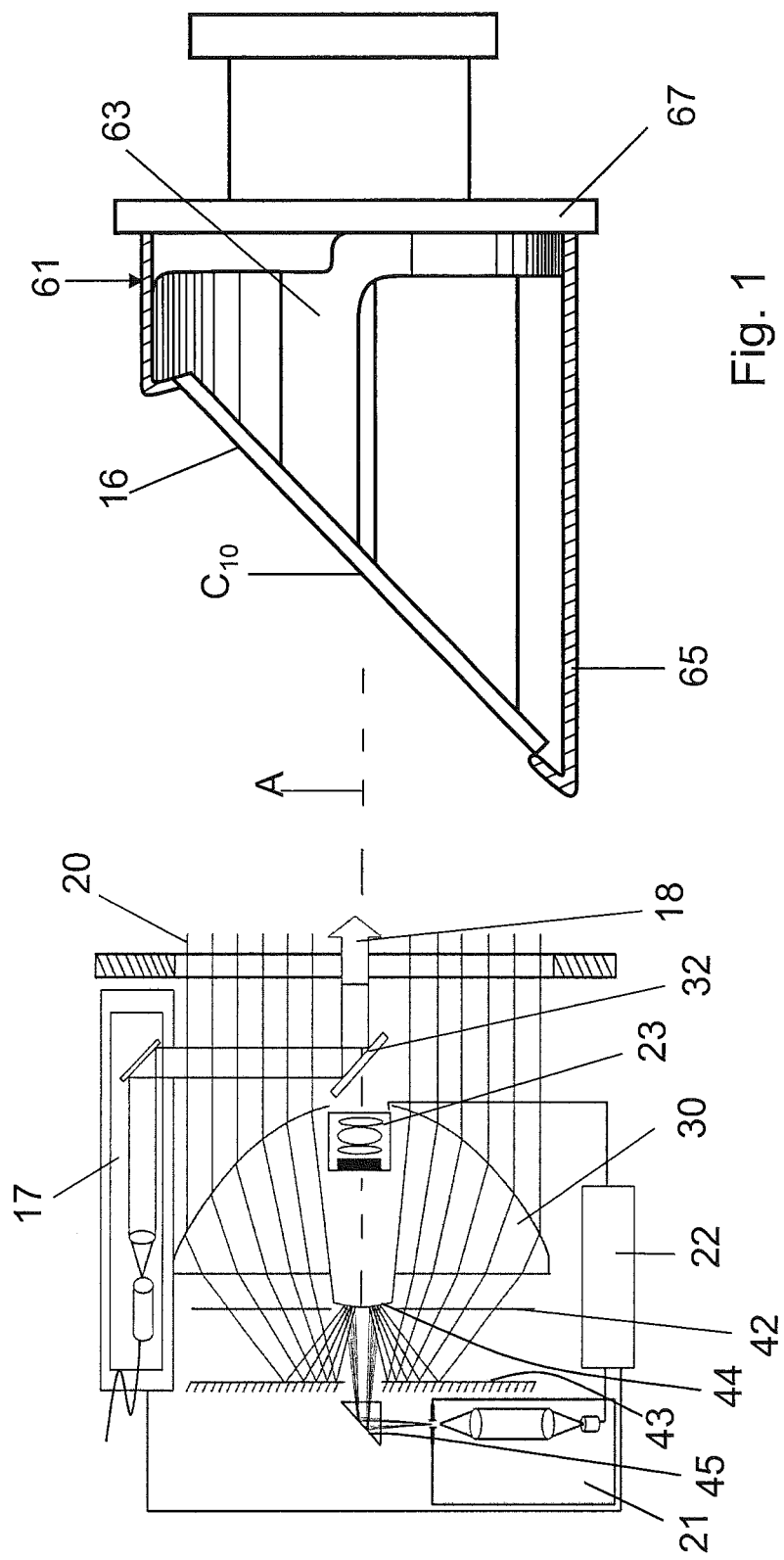
FIG. 1 is a partially sectional view of the laser scanner.
Figure 2:
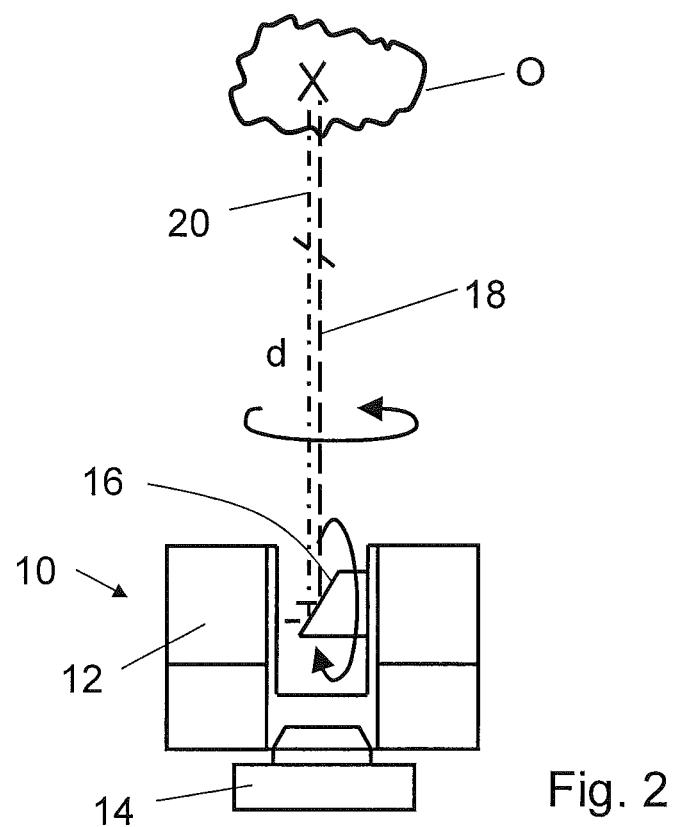
FIG. 2 is a schematic illustration of the laser scanner.

Referring to FIGS. 1 and 2, a laser scanner 10 is provided as a device for optically scanning and measuring the environment of the laser scanner 10. The laser scanner 10 has a measuring head 12 and a base 14. The measuring head 12 is mounted on the base 14 as a unit that can be rotated about a vertical axis. The measuring head 12 has a rotary mirror 16, which can be rotated about a horizontal axis. The intersection point of the two rotational axes is designated center $C_{10}$ of the laser scanner 10.

The measuring head 12 is further provided with a light emitter 17 for emitting an emission light beam 18. The emission light beam 18 may be a laser beam in the range of approximately 340 to 1600 nm wave length; for example 790 nm, 905 nm or less than 400 nm. Also other electro-magnetic waves having, for example, a greater wave length can be used. The emission light beam 18 is amplitude-modulated, for example with a sinusoidal or with a rectangular-waveform modulation signal. The emission light beam 18 is emitted by the light emitter 17 onto the rotary mirror 16, where it is deflected and emitted to the environment. A reception light beam 20 which is reflected in the environment by an object O or scattered otherwise, is captured again by the rotary mirror 16, deflected and directed onto a light receiver 21. The direction of the emission light beam 18 and of the reception light beam 20 results from the angular positions of the rotary mirror 16 and the measuring head 12, which depend on the positions of their corresponding rotary drives which, in turn, are registered by one encoder each.

A control and evaluation unit 22 has a data connection to the light emitter 17 and to the light receiver 21 in the measuring head 12, whereby parts of the unit 22 can be arranged also outside the measuring head 12, for example a computer connected to the base 14. The control and evaluation unit 22 determines, for a multitude of measuring points X, the distance d between the laser scanner 10 and the illuminated point at object O, from the propagation time of the emission light beam 18 and the reception light beam 20. For this purpose, the phase shift between the two light beams 18 and 20 is determined and evaluated.

Scanning takes place along a circle by means of the relatively quick rotation of the mirror 16. By virtue of the relatively slow rotation of the measuring head 12 relative to the base 14, the whole space is scanned step by step, by the circles. The entity of measuring points X of such a measurement is designated as a scan. For such a scan, the center $C_{10}$ of the laser scanner 10 defines the origin of the local stationary reference system. The base 14 rests in this local stationary reference system.

In addition to the distance d to the center $C_{10}$ of the laser scanner 10, each measuring point X comprises brightness information which is determined by the control and evaluation unit 22 as well. The brightness value is a gray-tone value which is determined, for example, by integration of the band-pass-filtered and amplified signal of the light receiver 21 over a measuring period which is attributed to the measuring point X. For certain applications it is desirable to have color information in addition to the gray-tone value. The laser scanner 10 is therefore also provided with a color camera 23 which is connected to the control and evaluation unit 22 as well. The color camera 23 may comprise, for example, a CCD camera or a CMOS camera and provides a signal which is three-dimensional in the color space, for example an RGB signal, for a two-dimensional picture in the real space. The control and evaluation unit 22 links the scan, which is three-dimensional in real space, of the laser scanner 10 with the colored pictures of the color camera 23, which are two-dimensional in real space, such process being designated "mapping". Linking takes place picture by picture for any of the colored pictures which have been taken to give as a final result a color in RGB shares to each of the measuring points X of the scan, i.e. to color the scan.

In the following, the measuring head 12 is described in details.

The reception light beam 20 which is reflected by the rotary mirror 16 hits on a plano-convex, spherical receiver lens 30 which, in embodiments of the present invention, has an approximate semi-spherical shape. The optical axis A of the receiver lens 30 is orientated towards the center $C_{10}$ of the laser scanner. The convex side of the highly-refractive receiver lens 30 is orientated towards the rotary mirror 16. The color camera 23 is arranged on the same side of the rotary mirror 16 as the receiver lens 30 and on its optical axis A. In embodiments of the present invention, the color camera 23 is arranged on the point of the receiver lens 30 which is closest to the rotary mirror 16. The color camera 23 may be fixed on the untreated surface of the receiver lens 30, for example, be glued on it, or be placed in an appropriate recess of the receiver lens 30.

In front of the color camera 23, i.e. closer to the rotary mirror 16, an emission mirror 32 is arranged, which is dichroic, i.e. in embodiments of the present invention the mirror 32 transmits visible light and reflects red laser light. The emission mirror 32 is consequently transparent for the color camera 23, i.e. the mirror 32 offers a clear view onto the rotary mirror 16. The emission mirror 32 is at an angle with the optical axis A of the receiver lens 30, so that the light emitter 17 can be arranged at the side of the receiver lens 30. The light emitter 17, which comprises a laser diode and a collimator, emits the emission light beam 18 onto the emission mirror 32, from where the emission light beam 18 is then projected onto the rotary mirror 16. For taking the colored pictures, the rotary mirror 16 rotates relatively slowly and step by step. However, for taking the scan, the rotary mirror 16 rotates relatively quickly (e.g., 100 cps) and continuously. The mechanism of the rotary mirror 16 remains the same.

Due to the arrangement of the color camera 23 on the optical axis A of the receiver lens 30, there is virtually no parallax between the scan and the colored pictures. Since, in known laser scanners, the light emitter 17 and its connection is arranged instead of the color camera 23 and its connection, for example a flexible printed circuit board, the shadowing effects of the receiver lens 30, due to the color camera 23 and to the emission mirror 32 do not change or change only insignificantly.

To also register remote measuring points X with a relatively large focal length on the one hand and, on the other hand, to require relatively little space, the laser scanner 10 has "folded optics." For this purpose, a mask 42 is arranged on the optical axis A behind the receiver lens 30, where the mask is orientated coaxially to the optical axis A. The mask 42 is arranged radially inward (i.e., as referred to the optical axis A) and has a relatively large free area to let the reception light beam 20, which is reflected by the remote objects O, pass unimpeded, while the mask 42, arranged radially outward, has relatively smaller shaded regions to reduce intensity of the reception light beam 20 which is reflected by nearby objects O, so that comparable intensities are available.

A rear mirror 43 is arranged on the optical axis A behind the mask 42, where the mirror is plane and perpendicular to the optical axis A. The rear mirror 43 reflects the reception light beam 20 which is refracted by the receiver lens 30 and which hits on the central mirror 44. The central mirror 44 is arranged in the center of the mask 42 on the optical axis A, which is shadowed by the color camera 23 and the emission mirror 32. The central mirror 44 is an aspherical mirror which acts as both a negative lens, i.e. increases the focal length, and as a near-field-correction lens, i.e. shifts the focus of the reception light beam 20 which is reflected by the nearby objects O. Additionally, a reflection is provided only by such part of the reception light beam 20, which passes the mask 42 which is arranged on the central mirror 44. The central mirror 44 reflects the reception light beam 20 which hits through a central orifice at the rear of the rear mirror 43.

The light receiver 21, which comprises an entrance diaphragm, a collimator with a filter, a collecting lens and a detector, is arranged at the rear of the rear mirror 43. To save space, a reception mirror 45 may be provided, which deflects the reception light beam 20 by 90°, so that the light receiver 21 can be arranged radial to the optical axis A. With the folded optics, the focal length can be approximately doubled with respect to known laser scanners.

Figure 3:
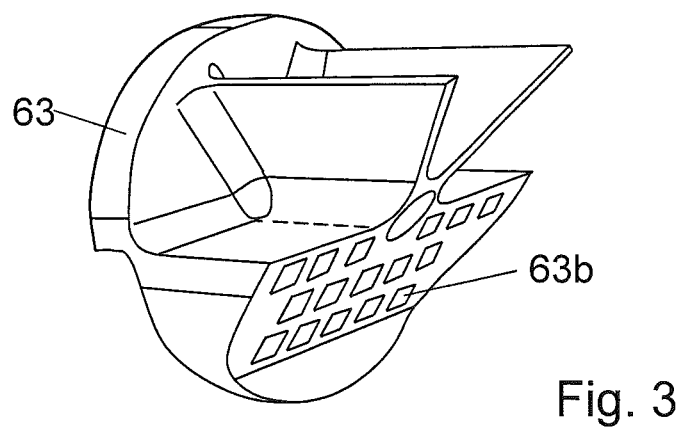
FIG. 3 is a perspective illustration of the rotor holder.

Referring also to FIG. 3, the rotary mirror 16 as a two-dimensional structure is part of a rotor 61 which can be turned as a three-dimensional structure by the corresponding rotary drive, and the angle position of the drive is measured by the assigned encoder. To save space also with respect to the rotary mirror 16 due to a relatively short design of the rotor 61 and to keep the rotor 61 balanced, the rotor 61 is designed as hybrid structure, comprising a holder 63, the rotary mirror 16 which is mounted at the holder 63 and a housing 65 made of plastic material, where the housing additionally holds the rotary mirror 16.

The metallic holder 63 has a cylindrical basic shape with a 45° surface and various recesses. Portions of material, for example blades, shoulders and projections, each of which serves for balancing the rotor 61, remain between theses recesses. A central bore serves for mounting the motor shaft of the assigned rotary drive. The rotary mirror 16 is made of glass, which is coated and reflects within the relevant wavelength range. The rotary mirror 16 is fixed at the 45° surface of the holder 63 by glue, for which purpose special attachment surfaces 63b are provided at the holder 63.

The housing 65 made of plastic material has the shape of a hollow cylinder which has been cut below 45° and encloses at least the holder 63. The housing 65 can be glued to the rotary mirror 16 or be fixed otherwise. The housing 65 can clasp the rotary mirror 16 at its periphery, for example in a form-locking manner, if necessary with the interposition of a rubber sealing or the like. The housing 65 can also be glued to the holder 63 or be otherwise fixed to the holder 63 directly, or, by the mounting of the rotor 61, the housing 65 can be connected to the holder 63, for example screwed to it, by an end plate 67. The glue used on the one hand offsets the different temperature coefficients of expansion of the materials used and, on the other hand, leaves the dynamic behavior unaffected, for example shows an elasticity which is not relatively too large, to avoid speed-dependent unbalances.

The rotor 61 rotates about the optical axis A. The rotary mirror 16 covers the holder 63 on one of its faces (namely on the 45° surface). The housing 65 covers the holder 63 radially outside with respect to the optical axis A. Thus, sharp edges of the holders 63 are covered to prevent injuries. The holder 63 is balancing the rotor 61. Instead of metal, the holder 63 may be made of another relatively heavy material, dominating the moment of inertia. Instead of plastic, the housing 65 may be made of another relatively light material, having few influences on the moment of inertia. Instead of coated glass, the rotary mirror 16 may be reflective (and transparent) otherwise. Designed as a hybrid structure, the rotary mirror 16, the holder 63, and the housing 65 are separately formed parts fixed together.

The invention claimed is:

1. A device for optically scanning and measuring an environment, comprising:
    a laser scanner having a light emitter that emits an emission light beam, the laser scanner also having a rotary mirror, the laser scanner further having a light receiver that receives a reception light beam, where the emission light beam is reflected by the rotary mirror to an object in the environment, where a portion of the emission light beam is reflected by the object to produce the reception light beam, and where the reception light beam is reflected by the rotary mirror and passes through a receiver lens which has an optical axis; and
    the laser scanner also comprises a color camera that takes colored pictures of the environment of the laser scanner, and a control and evaluation unit which, for a multitude of measuring points, determines a distance to the object and links the distance with the colored pictures, wherein the color camera is arranged on the optical axis of the receiver lens;
    wherein the rotary mirror rotates continuously for capturing the reception light beam, and wherein the rotary mirror rotates step by step when the color camera is taking the colored pictures.

2. A laser scanner for optically scanning and measuring an environment, the laser scanner comprising:
    a light emitter that emits an emission light beam along a first axis;
    a rotary mirror arranged to rotate about the first axis and a second axis, the first axis and the second axis intersecting at a center of the rotary mirror, the rotary mirror configured to reflect the emission light beam in a direction orthogonal to the first axis to an object in the environment, wherein a part of the emission light beam is reflected by the object to produce a reception light beam, the reception light beam being reflected along the first axis by the rotary mirror as a received light;
    a receiver lens having an optical axis coaxial with the first axis, the receiver lens configured to send a first portion of the received light to a light receiver;
    a color camera arranged on the first axis and configured to receive a second portion of the received light, the color camera further configured to provide colored pictures of the environment; and
    a control and evaluation unit configured to determine a distance for each of a multitude of measuring points and mapping the distances to the colored pictures, the distances based at least in part on a speed of light of the emission light beam and the reception light beam.

3. The laser scanner of claim 2, wherein the color camera is affixed to a surface of the receiver lens or arranged in a recess of the receiver lens.

4. The laser scanner of claim 2, wherein the receiver lens comprises a plano-convex spherical lens, wherein a convex side of the spherical lens is orientated towards the rotary mirror.

5. The laser scanner of claim 2, wherein an emission mirror is arranged between the color camera and the rotary mirror, wherein the emission mirror is at an angle with respect to the optical axis.

6. The laser scanner of claim 5, wherein the emission mirror is reflecting for the emission light beam and transparent for the color camera.

7. The laser scanner of claim 5, wherein the light emitter emits the emission light beam onto the emission mirror.

8. The laser scanner of claim 2, wherein the light emitter is arranged at the side of the receiver lens.

9. The laser scanner of claim 2, further comprising a measuring head that rotates about the second axis and bears the light emitter, the receiver lens, the color camera, the light receiver and the rotary mirror.

10. The laser scanner of claim 2 wherein the rotary mirror rotates continuously for capturing the reception light beam and wherein the rotary mirror rotates step by step when the color camera is taking the colored pictures.

* * * * *